(12) United States Patent
Shao et al.

(10) Patent No.: US 12,554,062 B2
(45) Date of Patent: Feb. 17, 2026

(54) PACKAGE DEVICES AND METHODS OF MANUFACTURE

(71) Applicant: Taiwan Semiconductor Manufacturing Co., Ltd., Hsinchu (TW)

(72) Inventors: Tung-Liang Shao, Hsinchu (TW); Yu-Sheng Huang, Hemei Township (TW); Chen-Hua Yu, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 316 days.

(21) Appl. No.: 18/323,523

(22) Filed: May 25, 2023

(65) Prior Publication Data

US 2024/0393533 A1 Nov. 28, 2024

(51) Int. Cl.
| | |
|---|---|
| *G02B 6/255* | (2006.01) |
| *G02B 6/122* | (2006.01) |
| *G02B 6/13* | (2006.01) |
| *G02B 6/42* | (2006.01) |
| *G02B 6/12* | (2006.01) |

(52) U.S. Cl.
CPC .......... *G02B 6/1228* (2013.01); *G02B 6/13* (2013.01); *G02B 6/2551* (2013.01); *G02B 6/4202* (2013.01); *G02B 2006/12121* (2013.01)

(58) Field of Classification Search
CPC ... G02B 6/2551; G02B 6/4202; G02B 6/4327
See application file for complete search history.

(56) References Cited

U.S. PATENT DOCUMENTS

| | | | | |
|---|---|---|---|---|
| 5,955,010 A | * | 9/1999 | Okada | G02B 6/2552 264/1.25 |
| 6,516,121 B2 | * | 2/2003 | Laor | G02B 6/4237 264/1.25 |
| 6,663,297 B1 | * | 12/2003 | Goldstein | B23K 26/18 385/95 |
| 6,917,728 B2 | * | 7/2005 | Lemmon | G02B 6/4202 385/95 |
| 6,945,712 B1 | | 9/2005 | Conn | |
| 2002/0009270 A1 | * | 1/2002 | Laor | G02B 6/43 385/95 |
| 2006/0198582 A1 | * | 9/2006 | Kakui | G02B 6/2852 385/48 |
| 2019/0285804 A1 | | 9/2019 | Ramachandran et al. | |

(Continued)

FOREIGN PATENT DOCUMENTS

| | | |
|---|---|---|
| TW | 201816946 A | 5/2018 |
| TW | 201941382 A | 10/2019 |

(Continued)

*Primary Examiner* — Charlie Y Peng
(74) *Attorney, Agent, or Firm* — Slater Matsil, LLP (57) ABSTRACT

A device is provided that includes: a photonic integrated circuit; a laser die comprising a welding pad; and a first optical fiber including: a first end of the first optical fiber fused to a surface of the photonic integrated circuit, wherein a first fusion bond exists between the first end of the first optical fiber and the surface of the photonic integrated circuit; and a second end of the first optical fiber fused to the welding pad, wherein a second fusion bond exists between the second end of the first optical cable and the welding pad.

20 Claims, 7 Drawing Sheets

(56) References Cited

U.S. PATENT DOCUMENTS

| | | |
|---|---|---|
| 2020/0006304 A1 | 1/2020 | Chang et al. |
| 2021/0157052 A1 | 5/2021 | Tai et al. |
| 2021/0223489 A1 | 7/2021 | Weng et al. |
| 2023/0384538 A1 | 11/2023 | Chen et al. |

FOREIGN PATENT DOCUMENTS

| | | |
|---|---|---|
| TW | 202014746 A | 4/2020 |
| TW | 202133258 A | 9/2021 |
| TW | 202134713 A | 9/2021 |
| TW | 202245286 A | 11/2022 |

\* cited by examiner

PACKAGE DEVICES AND METHODS OF MANUFACTURE

BACKGROUND

Electrical signaling and processing are one technique for signal transmission and processing. Optical signaling and processing have been used in increasingly more applications in recent years, particularly due to the use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission as well as processing and controlling. Accordingly, devices integrating long-range optical components and short-range electrical components are formed for the conversion between optical signals and electrical signals, as well as the processing of optical signals and electrical signals. Packages thus may include both optical (photonic) dies including optical devices and electronic dies including electronic devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments will now be discussed with respect to certain embodiments in which various optical fibers (e.g., optical cables) may be attached to various optical components utilizing a laser welding process. The laser welding process may be utilized to fuse the various optical fibers to the various optical components without the use of glue or other adhesives. However, the embodiments presented herein are intended to be illustrative and are not intended to limit the embodiments to the precise descriptions as discussed. Rather, the embodiments discussed may be incorporated into a wide variety of implementations, and all such implementations are fully intended to be included within the scope of the embodiments.

Figure 1:
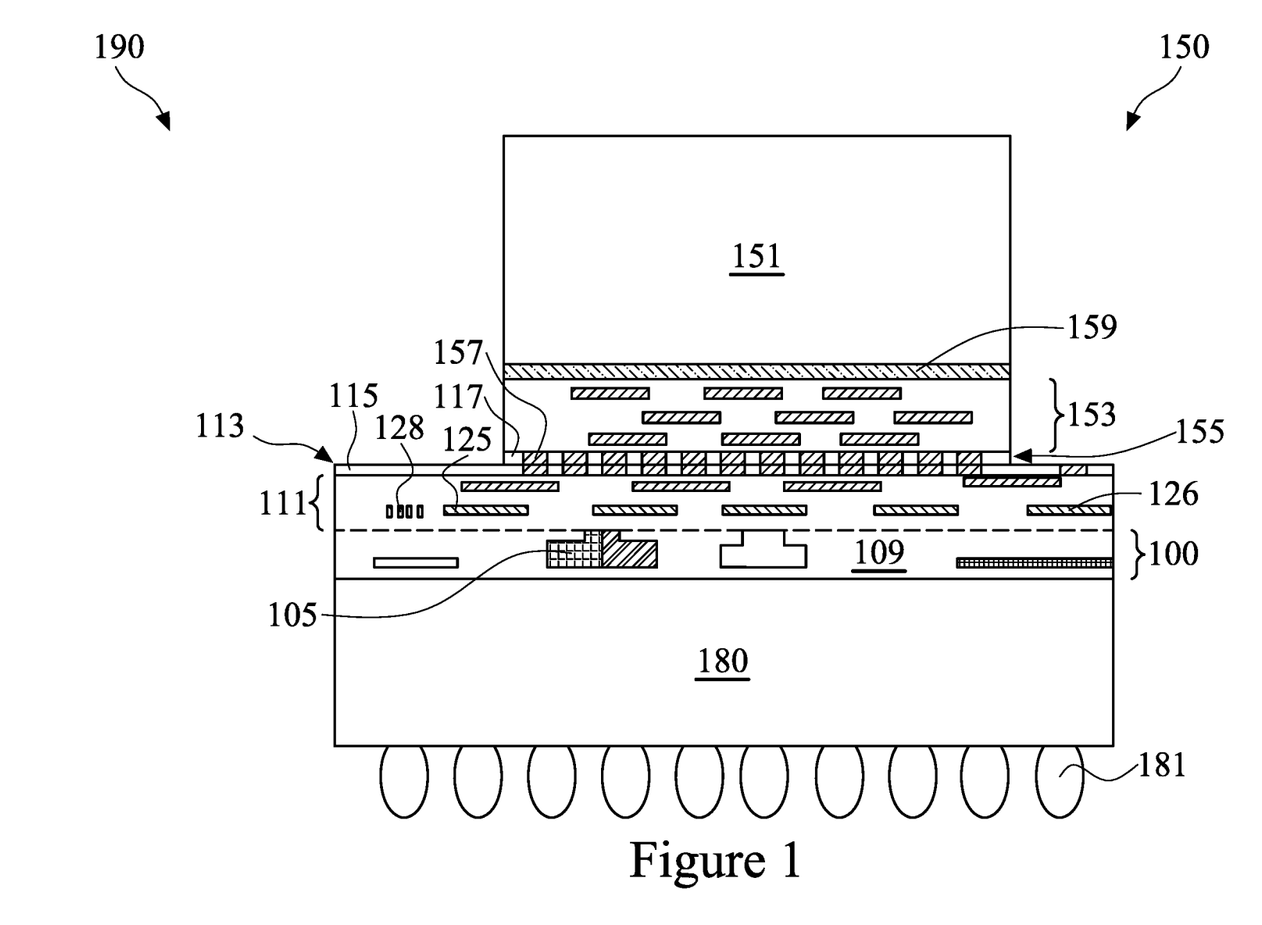
FIG. 1 illustrates a formation an photonic integrated circuit (PIC) package, in accordance with some embodiments.

With reference now to FIG. 1, there is illustrated a formation of a first device layer 100 of a first optical device package 190, in accordance with some embodiments. In the particular embodiment illustrated in FIG. 1, the first device layer 100 is an optical device, such as a photonic integrated circuit (PIC). In accordance with some embodiments, the first device layer 100 is formed over a first substrate (not separately illustrated) and a first insulating layer (not separately illustrated). A layer of material (not separately illustrated) may be formed over the first insulating layer and may be utilized as a base material for first optical components 105 formed in the first device layer 100. In an embodiment, at a beginning of the manufacturing process of the first device layer 100, the first substrate, the first insulating layer, and the layer of material for the first optical components 105 may collectively be part of a silicon-on-insulator (SOI) substrate. Looking first at the first substrate, the first substrate may be a semiconductor material such as silicon or germanium, a dielectric material such as glass, or any other suitable material that allows for structural support of overlying devices.

The first insulating layer may be a dielectric layer that separates the first substrate from the overlying first device layer 100 and can additionally, in some embodiments, serve as a portion of cladding material that surrounds the first optical components 105. In an embodiment the first insulating layer may be silicon oxide, silicon nitride, germanium oxide, germanium nitride, combinations of these, or the like, formed using a method such as implantation (e.g., to form a buried oxide (BOX) layer) or else may be deposited onto the first substrate using a deposition method such as chemical vapor deposition (CVD), atomic layer deposition (ALD), physical vapor deposition (PVD), combinations of these, or the like. However, any suitable material and method of manufacture may be used.

The material utilized in forming the first optical components 105 of the first device layer 100 is initially (prior to patterning) a conformal layer of material that will be used to begin manufacturing the first optical components 105 of the first device layer 100. In an embodiment the material for the first optical components 105 may be a translucent material that can be used as a core material for the desired first optical components 105, such as a semiconductor material such as silicon, germanium, silicon germanium, combinations of these, or the like. In other embodiments, the material for the first optical components 105 may be a dielectric material such as silicon nitride, silicon oxide, or the like. In embodiments in which the material of the first optical components 105 is deposited, the material for the first optical components 105 may be deposited using a method such as epitaxial growth, CVD, ALD, PVD, combinations of these, or the like. In other embodiments in which the first insulating layer is formed using an implantation method, the material of the first optical components 105 may initially be part of the first substrate prior to the implantation process to form the first insulating layer. However, any suitable materials and methods of manufacture may be utilized to form the material of the first optical components 105.

FIG. 1 further illustrates that, once the material for the first optical components 105 is ready, the first optical components 105 for the first device layer 100 are manufactured using the material for the first optical components 105. In embodiments the first optical components 105 of the first device layer 100 may include such components as optical waveguides (e.g., ridge waveguides, rib waveguides, buried channel waveguides, diffused waveguides, etc.), couplers (e.g., grating couplers, edge couplers, etc.), directional couplers, optical modulators (e.g., Mach-Zehnder silicon-photonic switches, microelectromechanical switches, micro-ring resonators, etc.), amplifiers, multiplexors, demultiplexors, optical-to-electrical converters (e.g., P-N junctions), electrical-to-optical converters, lasers, combinations of these, or the like. However, any suitable first optical components 105 may be used.

In accordance with some embodiments, to begin forming the first optical components 105 from the initial material, the material for the first optical components 105 may be patterned into the desired shapes for the first optical components 105 of the first device layer 100. In an embodiment, the material for the first optical components 105 may be patterned using, e.g., one or more photolithographic masking and etching processes. However, any suitable method of patterning the material for the first optical components 105 may be utilized. For some of the first optical components 105, such as waveguides or edge couplers, the patterning process may be all or at least most of the manufacturing that is used to form these first optical components 105.

FIG. 1 additionally illustrates that, for those components that utilize further manufacturing processes, such as Mach-Zehnder silicon-photonic switches that utilize resistive heating elements, additional processing may be performed either before or after the patterning of the material for the first optical components 105. For example, implantation processes, additional deposition and patterning processes for different materials (e.g., resistive heating elements, III-V materials for converters), combinations of all of these processes, or the like, can be utilized to help further the manufacturing of the various desired first optical components 105. In a particular embodiment, a deposition of a semiconductor material such as germanium may be performed on a patterned portion of the material of the first optical components 105. In such an embodiment, the semiconductor material may be epitaxially grown in order to help manufacture, e.g., a photodiode for an optical-to-electrical converter. All such manufacturing processes and all suitable first optical components 105 may be manufactured, and all such combinations are fully intended to be included within the scope of the embodiments.

Once the individual first optical components 105 of the first device layer 100 have been formed, a second insulating layer 109 may be deposited to cover the first optical components 105 of the first device layer 100 and may provide additional cladding material. In an embodiment, the second insulating layer 109 may be a dielectric layer that separates the individual first optical components 105 of the first device layer 100 from each other and from overlying structures and may serve as cladding material that surrounds the first optical components 105. In an embodiment, the second insulating layer 109 may be silicon oxide, silicon nitride, germanium oxide, germanium nitride, combinations of these, or the like. The second insulating layer 109 may be formed using a deposition method such as CVD, ALD, PVD, combinations of these, or the like. Once the material of the second insulating layer 109 has been deposited, the material may be planarized using, e.g., a chemical mechanical polishing process in order to either planarize a top surface of the second insulating layer 109 (in embodiments in which the second insulating layer 109 is intended to fully cover the first optical components 105) or else planarize the second insulating layer 109 with top surfaces of the first optical components 105. However, any suitable material and method of manufacture may be used.

FIG. 1 further illustrates that, once the first optical components 105 of the first device layer 100 have been manufactured and the second insulating layer 109 has been formed, first metallization layers 111 are formed over the first device layer 100 in order to electrically connect the first device layer 100 to control circuitry, to each other, and to subsequently attached devices. In an embodiment the first metallization layers 111 are formed of alternating layers of dielectric and conductive material and may be formed through any suitable processes (such as deposition, damascene, dual damascene, etc.). In particular embodiments, there may be multiple layers of metallization used to interconnect the various first optical components 105, but the precise number of first metallization layers 111 is dependent upon the design of the first optical device package 190.

Additionally, during the manufacture of the first metallization layers 111, one or more second optical components 125 may be formed as part of the first metallization layers 111. In some embodiments the second optical components 125 of the first metallization layers 111 may include such components as couplers (e.g., an edge coupler 126, a grating coupler 128, etc.) for connection to outside signals, optical waveguides (e.g., ridge waveguides, rib waveguides, buried channel waveguides, diffused waveguides, etc.), optical modulators (e.g., Mach-Zehnder silicon-photonic switches, microelectromechanical switches, micro-ring resonators, etc.), amplifiers, multiplexors, demultiplexors, optical-to-electrical converters (e.g., P-N junctions), electrical-to-optical converters, lasers, combinations of these, or the like. However, any suitable optical components may be used for the one or more second optical components 125.

In an embodiment the one or more second optical components 125 may be formed by initially depositing a material for the one or more second optical components 125. In an embodiment the material for the one or more second optical components 125 may be a dielectric material such as silicon nitride, silicon oxide, combinations of these, or the like, or a semiconductor material such as silicon, deposited using a deposition method such as chemical vapor deposition, atomic layer deposition, physical vapor deposition, combinations of these, or the like. However, any suitable material and any suitable method of deposition may be utilized.

Once the material for the one or more second optical components 125 has been deposited or otherwise formed, the material may be patterned into the desired shapes for the one or more second optical components 125. In an embodiment the material of the one or more second optical components 125 may be patterned using, e.g., one or more photolithographic masking and etching processes. However, any suitable method of patterning the material for the one or more second optical components 125 may be utilized.

For some of the one or more second optical components 125, such as waveguides or edge couplers, the patterning process may be all or at least most manufacturing that is used to form these components. Additionally, for those components that utilize further manufacturing processes, such as Mach-Zehnder silicon-photonic switches that utilize resistive heating elements, additional processing may be performed either before or after the patterning of the material for the one or more second optical components 125. For example, implantation processes, additional deposition and patterning processes for different materials, combinations of all of these processes, or the like, and can be utilized to help further the manufacturing of the various desired one or more second optical components 125. All such manufacturing processes and all suitable second optical components 125 may be manufactured, and all such combinations are fully intended to be included within the scope of the embodiments.

Once the one or more second optical components 125 of the first metallization layers 111 have been manufactured, a first bonding layer 113 is formed over the first metallization layers 111. In an embodiment, the first bonding layer 113 may be used for a dielectric-to-dielectric and metal-to-metal bond. In accordance with some embodiments, the first bonding layer 113 is formed of a first dielectric material 115 such as silicon oxide, silicon nitride, or the like. The first dielectric material 115 may be deposited using any suitable method, such as CVD, high-density plasma chemical vapor deposition (HDPCVD), PVD, atomic layer deposition (ALD), or the like. However, any suitable materials and deposition processes may be utilized.

Once the first dielectric material 115 has been formed, first openings in the first dielectric material 115 are formed to expose conductive portions of the underlying layers in preparation to form first bond pads 117 within the first bonding layer 113. Once the first openings have been formed within the first dielectric material 115, the first openings may be filled with a seed layer and a plate metal to form the first bond pads 117 within the first dielectric material 115. The seed layer may be blanket deposited over top surfaces of the first dielectric material 115 and the exposed conductive portions of the underlying layers and sidewalls of the openings and the second openings. The seed layer may comprise a copper layer. The seed layer may be deposited using processes such as sputtering, evaporation, or plasma-enhanced chemical vapor deposition (PECVD), or the like, depending upon the desired materials. The plate metal may be deposited over the seed layer through a plating process such as electrical or electro-less plating. The plate metal may comprise copper, a copper alloy, or the like. The plate metal may be a fill material. A barrier layer (not separately illustrated) may be blanket deposited over top surfaces of the first dielectric material 115 and sidewalls of the openings and the second openings before the seed layer. The barrier layer may comprise titanium, titanium nitride, tantalum, tantalum nitride, or the like.

Following the filling of the first openings, a planarization process, such as a CMP, is performed to remove excess portions of the seed layer and the plate metal, forming the first bond pads 117 within the first bonding layer 113. In some embodiments a bond pad via (not separately illustrated) may also be utilized to connect the first bond pads 117 with underlying conductive portions and, through the underlying conductive portions, connect the first bond pads 117 with the first metallization layers 111.

Additionally, the first bonding layer 113 may also include one or more third optical components (not separately illustrated) incorporated within the first bonding layer 113 in order to bridge incoming light (e.g., from the laser die 340, described further below). In such an embodiment, prior to the deposition of the first dielectric material 115, the one or more third optical components may be manufactured using similar methods and similar materials as the one or more second optical components 125 (described above), such as by being waveguides and other structures formed at least in part through a deposition and patterning process. However, any suitable structures, materials and any suitable methods of manufacture may be utilized.

FIG. 1 further illustrates a bonding of a first semiconductor device 150 to the first bonding layer 113. In some embodiments, the first semiconductor device 150 is an electronic integrated circuit (EIC—e.g., devices without optical devices) and may have a semiconductor substrate 151, a layer of active devices 159, an overlying interconnect structure 153, a second bonding layer 155, and associated second bond pads 157. In an embodiment, the layer of active devices 159 may be transistors, capacitors, resistors, and the like formed over the semiconductor substrate 151, the interconnect structure 153 may be similar to the first metallization layers 111, the second bonding layer 155 may be similar to the first bonding layer 113, and the second bond pads 157 may be similar to the first bond pads 117. However, any suitable devices may be utilized.

In an embodiment, the first semiconductor device 150 may be configured to work with the first device layer 100 for a desired functionality. In some embodiments the first semiconductor device 150 may be an ASIC device, a high bandwidth memory (HBM) module, an xPU, a logic die, a 3DIC die, a CPU, a GPU, a SoC die, a MEMS die, combinations of these, or the like. Any suitable device with any suitable functionality, may be used, and all such devices are fully intended to be included within the scope of the embodiments.

Once the first semiconductor device 150 has been prepared, the first semiconductor device 150 may be bonded to the first bonding layer 113. In an embodiment the first semiconductor device 150 may be bonded to the first bonding layer 113 using, e.g., a system on integrated circuit (SoIC) bond such as a dielectric-to-dielectric and metal-to-metal bonding process. In such an embodiment the first semiconductor device 150 is bonded to the first bond layer 113 of the first device layer 100 by bonding both the first bond pads 117 to the second bond pads 157 and by bonding the dielectrics within the first bonding layer 113 (e.g., the first dielectric material 115) to the dielectrics within the second bonding layer 155. In this embodiment a surface of the first semiconductor device 150 and the first bonding layer 113 may first be activated utilizing, e.g., a dry treatment, a wet treatment, a plasma treatment, exposure to an inert gas, exposure to $H_2$, exposure to $N_2$, exposure to $O_2$, or combinations thereof, as examples. In embodiments where a wet treatment is used, an RCA cleaning may be used, for example. However, any suitable activation process may be utilized.

After the activation process the first semiconductor device 150 and the first bonding layer 113 may be cleaned using, e.g., a chemical rinse, and then the first semiconductor device 150 is aligned and placed into physical contact with the first bonding layer 113. The first semiconductor device 150 and the first bonding layer 113 are then subjected to thermal treatment and contact pressure to bond the first semiconductor device 150 and the first bonding layer 113. For example, the first semiconductor device 150 and the first bonding layer 113 may be subjected to a pressure of about 150 kPa or less, and a temperature between about 25° C. and about 250° C. to fuse the first semiconductor device 150 and the first bonding layer 113. The first semiconductor device 150 and the first bonding layer 113 may then be subjected to a temperature at or above the eutectic point for material of the first bond pads 117 and the second bond pads 157, e.g., between about 150° C. and about 650° C., to fuse the first bond pads 117 and the second bond pads 157. In this manner, bonding of the first semiconductor device 150 and the first device layer 100 forms a bonded device. In some embodiments, the bonded first semiconductor device 150 is baked, annealed, pressed, or otherwise treated to strengthen or finalize the bond.

Additionally, while the above description describes a dielectric-to-dielectric and metal-to-metal bonding process, this is intended to be illustrative and is not intended to be limiting. In yet other embodiments, the first device layer 100 and the first metallization layers 111 (with or without the first bonding layer 113) may be bonded to the first semiconductor device 150 by direct surface bonding, metal-to-metal bonding, or another bonding process. In other embodiments, the first semiconductor device 150 and the first metallization layers 111 over the first device layer 100 (with or without the first bonding layer 113) are bonded by metal-to-metal bonding that is achieved by fusing conductive elements. In an embodiment, the conductive elements may be copper pillars (not separately illustrated) that are disposed between the first semiconductor device 150 and the first metallization layers 111. However, any suitable bonding process may be utilized, and all such methods are fully intended to be included within the scope of the embodiments.

In an embodiment, following the attachment of the first semiconductor device 150 to the first metallization layers 111, the first substrate and, optionally, the first insulating layer may be removed, thereby exposing a surface of the first device layer 100. In an embodiment the first substrate and the first insulating layer may be removed using a planarization process, such as a chemical mechanical polishing process, a grinding process, one or more etching processes, combinations of these, or the like. However, any suitable method may be used in order to remove the first substrate and/or the first insulating layer.

Once the first substrate and the first insulating layer have been removed, a second device layer 180 of fourth optical components (not separately illustrated) may be formed on a back side of the first device layer 100. In an embodiment the second device layer 180 of fourth optical components may be formed using similar materials and similar processes as the second optical components 125 of the first metallization layers 111. For example, the second device layer 180 of fourth optical components may be formed of alternating layers of a cladding material such as silicon oxide and core material such as silicon nitride formed using deposition and patterning processes in order to form optical components such as waveguides and the like.

In an embodiment first through device vias (not separately illustrated) extend through the second device layer 180 and the first device layer 100 so as to provide a quick passage of power, data, and ground through into the first device layer 100. In an embodiment the first through device vias may be formed by initially forming through device via openings into the second device layer 180 and the first device layer 100. The through device via openings may be formed by applying and developing a suitable photoresist (not shown), and removing portions of the second device layer 180 and the first device layer 100 that are exposed.

Once the through device via openings have been formed within the first device layer 100 and the second device layer 180, the through device via openings may be lined with a liner. The liner may be, e.g., an oxide formed from tetraethylorthosilicate (TEOS) or silicon nitride, although any suitable dielectric material may alternatively be used. The liner may be formed using a plasma enhanced chemical vapor deposition (PECVD) process, although other suitable processes, such as physical vapor deposition or a thermal process, may alternatively be used.

Once the liner has been formed along the sidewalls and bottom of the through device via openings, a barrier layer (not separately illustrated) may be formed and the remainder of the through device via openings may be filled with first conductive material. The first conductive material may comprise copper, although other suitable materials such as aluminum, alloys, doped polysilicon, combinations thereof, and the like, may be utilized. The first conductive material may be formed by electroplating copper onto a seed layer (not shown), filling and overfilling the through device via openings. Once the through device via openings have been filled, excess liner, barrier layer, seed layer, and first conductive material outside of the through device via openings may be removed through a planarization process such as chemical mechanical polishing (CMP), although any suitable removal process may be used.

Optionally, in some embodiments once the first through device vias have been formed, second metallization layers may be formed in electrical connection with the first through device vias. In an embodiment the second metallization layers may be formed as described above with respect to the first metallization layers 111, such as being alternating layers of dielectric and conductive materials using damascene processes, dual damascene process, or the like. In other embodiments, the second metallization layers may be formed using a plating process to form and shape conductive material, and then cover the conductive material with a dielectric material. However, any suitable structures and methods of manufacture may be utilized.

In an embodiment, third bond pads (not separately illustrated) may be formed to provide conductive regions for contact between the first through device vias to other external devices. In an embodiment the third bond pads may be formed in a similar fashion and using similar materials as the first bond pads 117, or else may be formed using a deposition and patterning process. However, any suitable material and method of manufacture may be utilized.

In an embodiment, once the third bond pads have been formed, a second interconnect structure (not separately illustrated), underbump metallization layers (not separately illustrated), and external connections 181 may be formed to complete one embodiment of a first optical device package 190. In an embodiment the second interconnect structure may be formed using methods and materials similar to the formation of the first metallization layer 111. However, any suitable methods and materials may be used.

The underbump metallization layers may comprise three layers of conductive materials, such as a layer of titanium, a layer of copper, and a layer of nickel. However, one of ordinary skill in the art will recognize that there are many suitable arrangements of materials and layers, such as an arrangement of chrome/chrome-copper alloy/copper/gold, an arrangement of titanium/titanium tungsten/copper, or an arrangement of copper/nickel/gold, that are suitable for the formation of the underbump metallization layers. Any suitable materials or layers of material that may be used for the underbump metallization layers are fully intended to be included within the scope of the embodiments.

In an embodiment the underbump metallization layers are created by forming each layer over the second interconnect structure. The forming of each layer may be performed using a plating process, such as electrochemical plating, although other processes of formation, such as sputtering, evaporation, or PECVD process, may alternatively be used depending upon the desired materials. The underbump metallization layers may be formed to have a thickness of between about 0.7 µm and about 10 µm, such as about 5 µm.

In an embodiment the first external connections 181 may be placed on the underbump metallization layers and may be, e.g., a ball grid array (BGA) which comprises a eutectic material such as solder, although any suitable materials may be used. In an embodiment in which the first external connections 181 are solder bumps, the first external connections 181 may be formed using a ball drop method, such as a direct ball drop process. In another embodiment, the solder bumps may be formed by initially forming a layer of tin through any suitable method such as evaporation, electroplating, printing, solder transfer, and then performing a reflow in order to shape the material into the desired bump shape. Once the first external connections 181 have been formed, a test may be performed to ensure that the structure is suitable for further processing.

Figure 2:
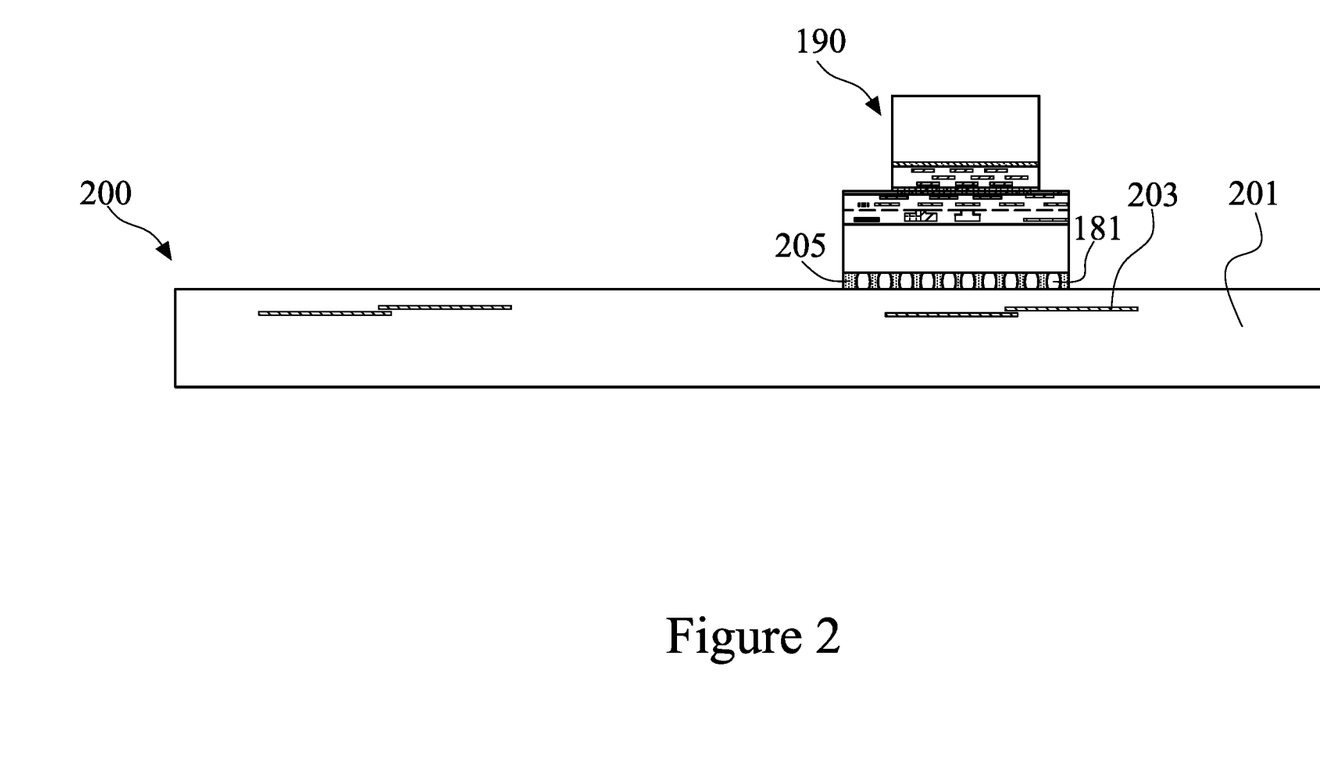
FIG. 2 illustrates attaching the PIC package to a substrate, in accordance with some embodiments.

With reference now to FIG. 2, there is illustrated a bonding of the first optical device package 190 to a second substrate 200 with, e.g., the first external connections 181. In an embodiment the second substrate 200 may be a package substrate, which may be a printed circuit board (PCB) or the like. The second substrate 200 may include one or more dielectric layers 201 and electrically conductive features 203, such as conductive lines and vias. In some embodiments, the second substrate 200 may include through-vias, active devices, passive devices, and the like. The second substrate 200 may further include conductive pads formed at the upper and lower surfaces of the second substrate 200.

The first external connections 181 may be aligned with corresponding conductive connections on the second substrate 200. Once aligned and in physical contact, the first external connections 181 are reflowed by raising the temperature of the past a eutectic point of the, thereby shifting the material of the first external connections 181 to a liquid phase. Once reflowed, the temperature is reduced in order to shift the material of the back to a solid phase, thereby bonding the first optical device package 190 to the second substrate 200. However, any suitable bonding process may be used to connect the first optical device package 190 to the second substrate 200.

Once the first optical device package 190 and the second substrate 200 have been bonded, an first underfill material 205 may be placed. The first underfill material 205 may reduce stress and protect the joints resulting from the reflowing of the first external connections 181. The first underfill material 205 may be placed by a capillary flow process after the first optical device package 190 and the second substrate 200 are attached.

Figure 3:
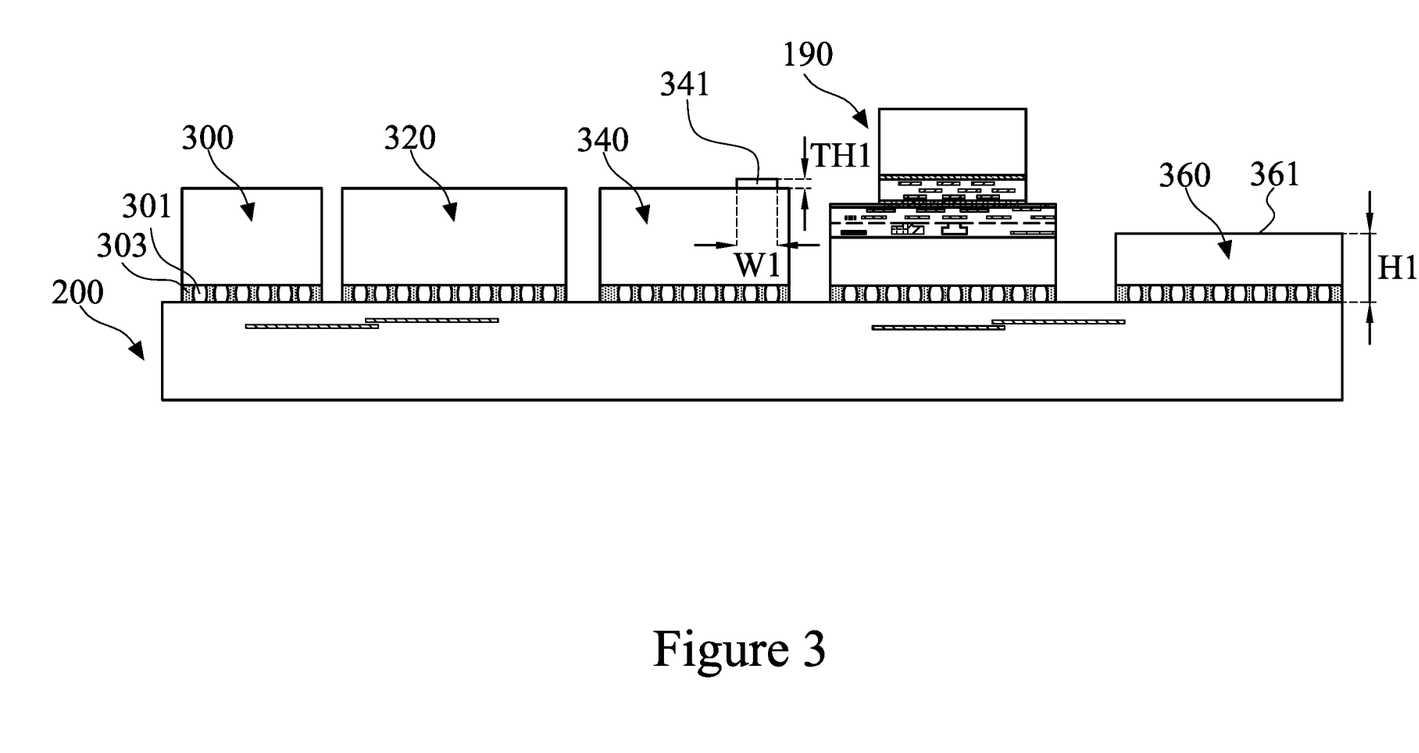
FIG. 3 illustrates attaching various semiconductor and optical components to the substrate and the formation of an optical welding pad, in accordance with some embodiments.

With reference now to FIG. 3, there is illustrated a bonding of a second semiconductor device 300, a third semiconductor device 320, a laser die 340, and a groove structure 360 onto the second substrate 200. In some embodiments, the second semiconductor device 300 is an electronic integrated circuit (EIC) such as a single semiconductor die (e.g., a single memory die), a stacked device that includes multiple, interconnected semiconductor substrates, or other functional circuitry packages. For example, the second semiconductor device 300 may be a memory device such as a high bandwidth memory (HBM) module, a hybrid memory cube (HMC) module, or the like that includes multiple stacked memory dies. In such embodiments, the second semiconductor device 300 includes multiple semiconductor substrates interconnected by through device vias (TDVs). Each of the semiconductor substrates may (or may not) have a layer of active devices and an overlying interconnect structure, a bond layer, and associated bond pads in order to interconnect the multiple devices within the second semiconductor device 300.

Of course, while the second semiconductor device 300 is a HBM module in one embodiment, the embodiments are not restricted to the second semiconductor device 300 being an HBM module. Rather, the second semiconductor device 300 may be any suitable semiconductor device, such as a processor die or other type of functional die. In particular embodiments the second semiconductor device 300 may be an xPU, a logic die, a 3DIC die, a CPU, a GPU, a SoC die, a MEMS die, combinations of these, or the like. Any suitable device with any suitable functionality, may be used, and all such devices are fully intended to be included within the scope of the embodiments.

In some embodiments, the third semiconductor device 320 may be another EIC that is intended to work with both the first optical device package 190 and the second semiconductor device 300. In some embodiments the third semiconductor device 320 may be any suitable type of device (e.g., an xPU, a logic die, a 3DIC die, a CPU, a GPU, a SoC die, a MEMS die, combinations of these, or the like) and may have a different functionality from the second semiconductor device 300, such as by being an xPU device, or may have a same functionality as the second semiconductor device 300, such as by being another high bandwidth memory device. Any suitable device may be utilized.

In an embodiment, the laser die 340 may be connected to the second substrate 200. In some embodiments, the laser die 340 may be utilized to generate light in order to power the other optical components (e.g., the first optical components 105, the second optical components 125, the third optical components, etc.), and may comprise light generating structures such as a laser diode (not separately illustrated). In particular embodiments the laser diode may be a Fabry-Perot Diode, and may be based on III-V materials, II-VI materials, or any other suitable set of materials.

Additionally, in an embodiment, a first welding pad 341 may be formed on a surface of the laser die 340. In the embodiment illustrated in FIG. 3, the first welding pad 341 is formed on a top surface of the laser die 340. The first welding pad 341 may be utilized as an external interface location between the laser die 340 and an optical fiber (e.g., a first optical fiber 400, not illustrated in FIG. 3, but illustrated in FIG. 4). The first welding pad 341 may be formed from an optical material, such as silicon dioxide ($SiO_2$), $Al_2O_3$, amorphous silicon, the like, or a combination thereof. However, any suitable optical material may be utilized for forming the first welding pad 341. In an embodiment the optical material for the first welding pad 341 may be formed over the top surface of the laser die 340 through methods such as chemical vapor deposition (CVD), plasma enhanced CVD, sputter, or thermal oxidation. However, any suitable deposition or formation process may be utilized in forming the optical material for the first welding pad 341. In an embodiment, the first welding pad 341 may be formed from the optical material through a combination of photolithography and etching to pattern the optical material into the desired shape for the first welding pad 341. However, any suitable patterning process may be utilized in forming the first welding pad 341 from the optical material.

Following the patterning of the optical material, the first welding pad 341 may have a first width W1 across the surface of the laser die in a range from 10 µm to 300 µm and a first length (not separately illustrated) across the surface of the laser die in a range from 10 µm to 12,000 µm. If the first welding pad 341 does not have the first width W1 and the first length then the first welding pad 341 may not provide adequate surface area for the external interface location between the laser die 340 and the optical fiber. Further, following the patterning of the optical material, the first welding pad 341 may have a first thickness TH1 from the surface of the laser die in a range from 10 µm to 1,000 µm. If the first welding pad 341 does not have the first thickness TH1 then the welding pad may interfere with the transferring of light generated from the laser die 340 through the optical fiber such that resulting light transfer from the laser die 340 is not suitably functional.

Figure 5:
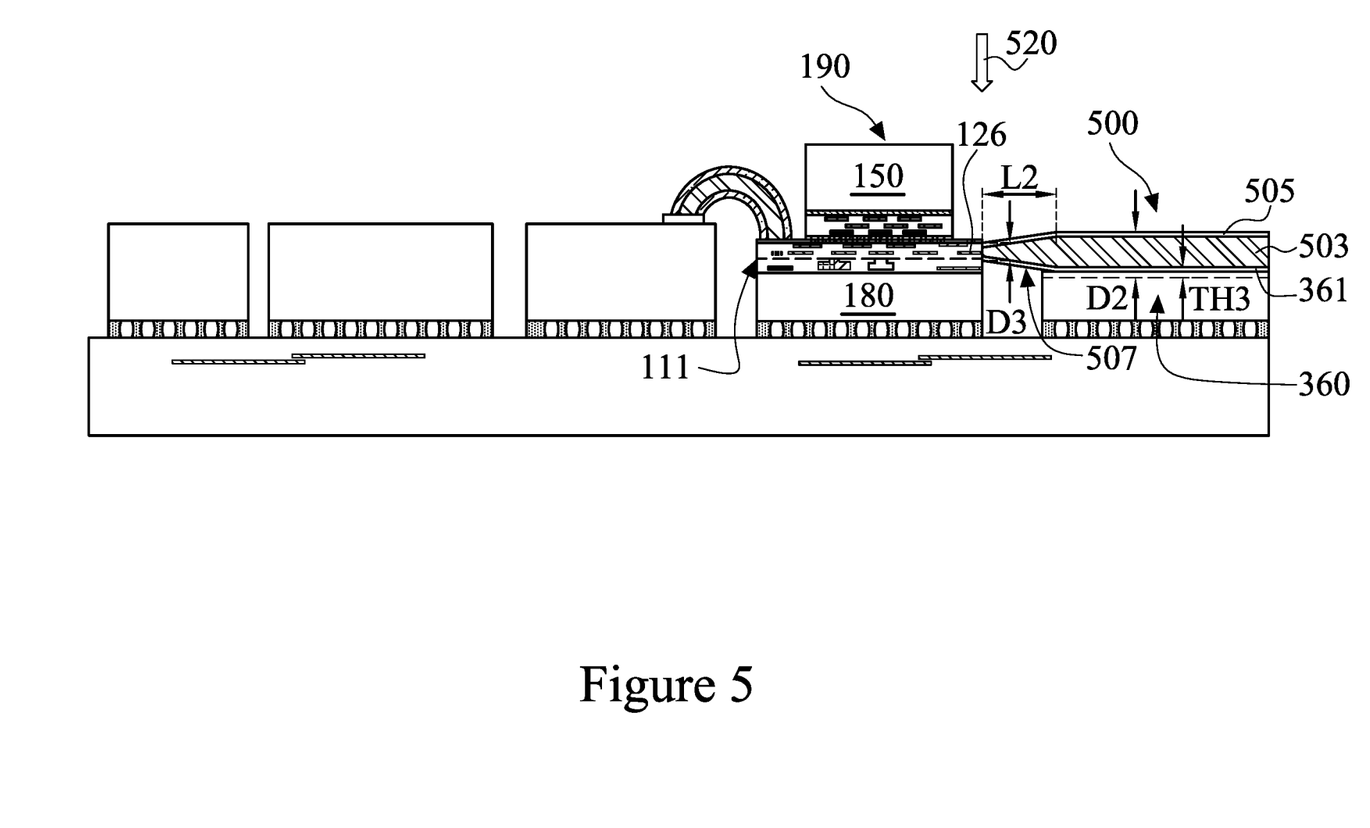
FIG. 5 illustrates an attachment of a tapered optical cable to the PIC package and a disposing of the tapered optical cable over a support structure, in accordance with some embodiments.

In an embodiment, the groove structure 360 may be connected to the second substrate 200. In some embodiments, the groove structure 360 may be utilized as a support structure for an optical fiber (e.g. a second optical fiber 500, not illustrated in FIG. 3, but illustrated in FIG. 5). In an embodiment, the groove structure 360 may comprise silicon, glass (e.g., quartz, Pyrex, Tempax, etc.), the like, or a combination thereof. In accordance with some embodiments, the groove structure 360 may have a top surface 361 in which material from the top surface 361 is recessed to form a groove in the top surface 361. The optical fiber (e.g. the second optical fiber 500, as illustrated in FIG. 5) may be disposed in the groove. In some embodiments, the groove of the groove structure 360 may be a V-shape, or a U-shape. However, it should be noted that any suitable shape may be utilized for the groove of the groove structure 360 and in some embodiments, the top surface 361 of the groove structure 360 remains flat and may still function to support the optical fiber.

In some embodiments, the groove structure 360 may provide a precise alignment for the optical fiber to a target position on a surface of the first optical device package 190. For example, the groove of the groove structure 360 may prevent or reduce the rolling of the optical fiber when disposed within the groove. In addition, the groove of the groove structure 360 may be formed by suitable lithography and etching processes, and the position and size of the groove can be precisely controlled. In accordance with some embodiments, the groove structure 360 may have a first height H1 above the second substrate 200 in a range from 200 µm to 1,000 µm and the optical fiber may have an embedded portion disposed within the groove, such that when the groove of the groove structure 360 is at the first height H1 the optical fiber is aligned with the target position on the surface of the first optical device package 190. If the groove of the groove structure 360 is not at the first height H1 the optical fiber may disposed within the groove may not be able to align with the target position on the surface of the first optical device package 190.

In an embodiment the second semiconductor device 300 and the third semiconductor device 320, the laser die 340, and the groove structure 360 may be bonded to the second substrate 200 using, e.g., second external connections 301. The second external connections 301 may be conductive bumps (e.g., ball grid arrays, microbumps, etc.) or conductive pillars utilizing materials such as solder and copper. In an embodiment in which the second external connections 301 are contact bumps, the second external connections 301 may comprise a material such as tin, or other suitable materials, such as silver, lead-free tin, or copper. In an embodiment in which the second external connections 301 are tin solder bumps, the second external connections 301 may be formed by initially forming a layer of tin through such commonly used methods such as evaporation, electroplating, printing, solder transfer, ball placement, etc. Once a layer of tin has been formed on the structure, a reflow may be performed in order to shape the material into the desired bump shape.

Additionally, once the second external connections 301 have been placed, the second semiconductor device 300, the third semiconductor device 320, the laser die 340, and the groove structure 360 are aligned with the second substrate 200. Once aligned and in physical contact, the second external connections 301 are reflowed by raising the temperature of the second external connections 301 past a eutectic point of the second external connections 301, thereby shifting the material of the second external connections 301 to a liquid phase. Once reflowed, the temperature is reduced in order to shift the material of the second external connections 301 back to a solid phase, thereby bonding the second semiconductor device 300, the third semiconductor device 320, the laser die 340, and the groove structure 360 to the second substrate 200.

Once the second semiconductor device 300, the third semiconductor device 320, the laser die 340, and the groove structure 360 have been bonded, a second underfill material 303 may be placed. The second underfill material 303 may reduce stress and protect the joints resulting from the reflowing of the second external connections 301. The second underfill material 303 may be placed by a capillary flow process after the second semiconductor device 300, the third semiconductor device 320, the laser die 340 and the groove structure 360 are attached.

In accordance with another embodiment, the groove structure 360 may be attached to the second substrate 200 utilizing a glue (not separately illustrated). In this embodiment the second external connections 301 and the second underfill material 303 may be omitted from the groove structure 360. The glue may be deposited over a top surface of the second substrate 200 and the groove structure 360 may be placed in direct physical contact with the glue. The glue may be an epoxy material or may be more specifically an optical glue such as epoxy-acrylate and oligomers. In an embodiment, the glue may be subjected to a curing process such as a light cure, a heat cure, or the like, to harden the glue.

Figure 4:
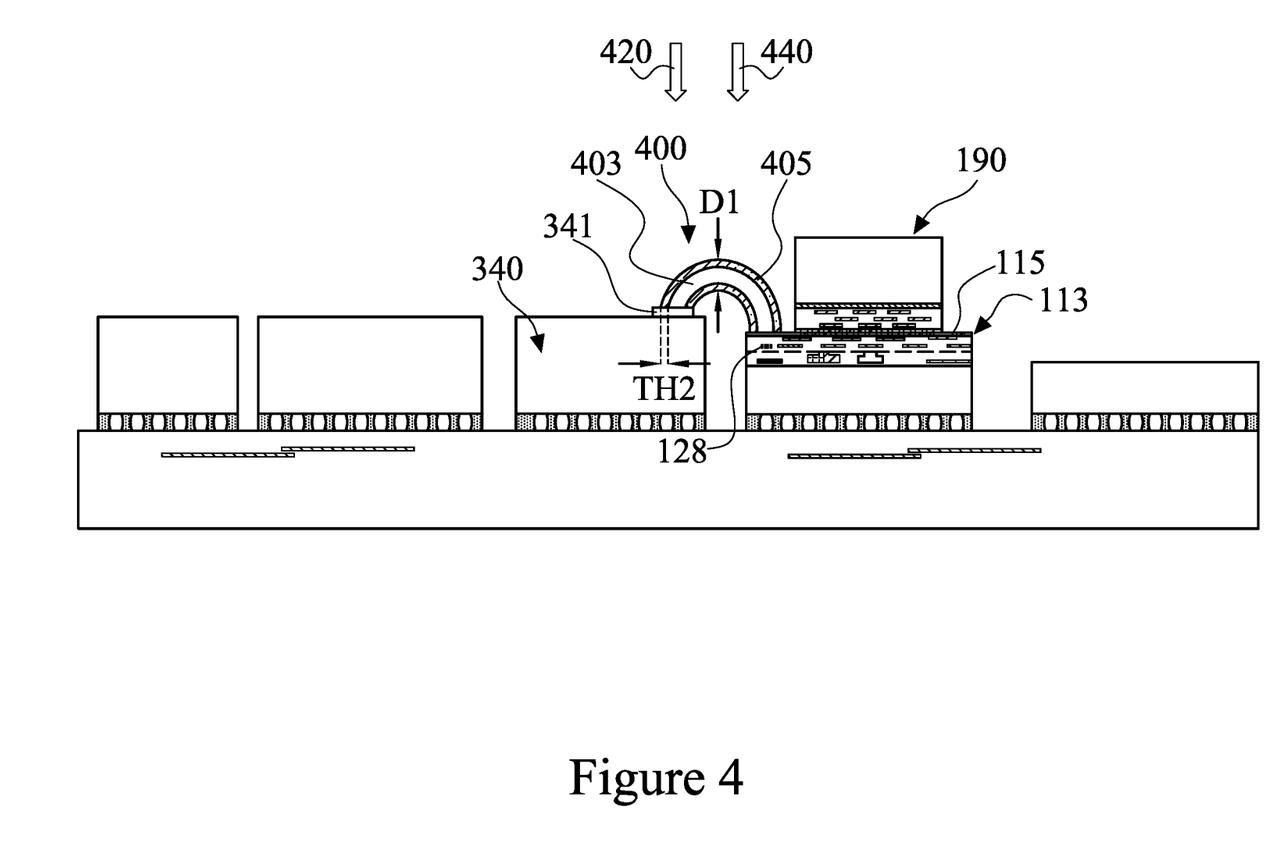
FIG. 4 illustrates laser welding processes utilized in attaching a first optical cable to the PIC package and an adjacent optical component, in accordance with some embodiments.

With reference now to FIG. 4, there is illustrated the first optical fiber 400 attached to the laser die 340 and the first optical device package 190. In an embodiment the first optical fiber 400 is placed so as to optically couple the laser die 340 and an optical input, such as the grating coupler 128, located within the first optical device package 190. By positioning the first optical fiber 400 in optical connection with the grating coupler 128, optical signals leaving the first optical fiber 400 are directed into the optical components (e.g. the second optical components 125) of the first optical device package 190.

In an embodiment, the first optical fiber 400 may comprise a core material 403 surrounded by a cladding layer 405. Optionally, a surrounding cover material (not separately illustrated) may be used to surround the cladding layer 405 in order to provide protection. In an embodiment, the core material 403 may comprise optical materials such as glass, air, the like, or a combination thereof. Further, the cladding layer 405 may comprise one or more layers of cladding material, wherein the cladding material may comprise of silicon dioxide ($SiO_2$), silica glass, the like, or combinations thereof. However, any suitable material may be utilized for the core material 403 and the cladding layer 405.

In an embodiment, the first optical fiber 400, either with or without the cover material, may have a first diameter D1 in a range of 50 µm to 250 µm, such as about 200 µm. If the first optical fiber 400 does not have the first diameter $D_1$ then light generated from the laser die 340 may not be adequately be transferred through the first optical fiber 400 to the optical input (e.g., the grating coupler 128) located within the first optical device package 190. Further, in an embodiment, the cladding layer 405 may be formed to a second thickness TH2 in a range from 40 µm to 190 µm. If the cladding layer 405 is not formed to the second thickness TH2 then the amount of surface area between the cladding layer 405 and an interface material may not form an adequate weld between the first optical fiber 400 and a corresponding optical component formed through fusion bonding by subsequently discussed laser welding processes.

In an embodiment, the positioning of the first optical fiber 400 with the laser die 340 comprises aligning and placing in physical contact a first end of the first optical fiber 400 with a first external interface location on the surface of the laser die 340, wherein the first external interface location may be the first welding pad 341. In an embodiment, once the first end of the first optical fiber 400 is aligned and placed in physical contact with the first welding pad 341, the first optical fiber 400 may be adhered to the first welding pad 341 through a first welding process 420. The first welding process 420 may adhere one or more materials of the first optical fiber 400 to the first welding pad 341 by providing localized heat at an interface between the first optical fiber 400 and the first welding pad 341 thereby welding the first optical fiber 400 to the first welding pad 341. In some embodiments, the first welding process 420 may be a laser welding process wherein a laser is utilized to provide the localized heat at the interface between the first optical fiber 400 and the first external interface location.

In accordance with some embodiments, the first welding process 420 is performed by applying suitable localized heat for an appropriate time to form a suitable weld between the first optical fiber 400 and the first welding pad 341. The localized heat may be applied to raise a first temperature to a range from 400° C. to 1,000° C. at an interface between the first welding pad 341 and the first optical fiber 400. If the first temperature is not reached at this interface then the formation of covalent bonds may not be induced between the first optical fiber 400 and the first welding pad 341 producing an inadequate weld. Further, in an embodiment, the first welding process 420 may be performed for a time in a range between 0.1 seconds to 5 seconds. If the first welding process 420 is not conducted for this time then the first temperature may not be reached and the amount of fusion bonding between the first optical fiber 400 and the first welding pad 341 may not be sufficient for form an adequate weld between the first optical fiber 400 and the first welding pad 341.

In accordance with some embodiments, the localized heat provided by the first welding process 420 induces the formation of covalent bonds between the first welding pad 341 and both the core material 403 and the cladding layer 405 of the first optical fiber 400 at the interface between the first optical fiber 400 and the first welding pad 341. In this embodiment, the formation of covalent bonds between the first welding pad 341 and both the core material 403 and the cladding layer 405 of the first optical fiber 400 results in the first welding pad 341 being fusion bonded to the first optical fiber 400.

In another embodiment, the first welding process 420 applies the localized heat to the cladding layer 405 so that covalent bonds are formed between the cladding layer 405 and the first welding pad 341 but the formation of covalent bonds between the core material 403 and the first welding pad 341 may be avoided (e.g., no fusion bond is formed between the core material 403 and the first welding pad 341). In this embodiment, the cladding layer 405 may be formed to the second thickness TH2. If the cladding layer 405 is not formed to the second thickness TH2 then the amount of surface area between the cladding layer 405 and the first welding pad 341 may not form an adequate weld between the first optical fiber 400 and the first optical device package 190 formed through fusion bonding by the first welding process 420. In this embodiment the core material 403 is held in physical contact with the first external interface location on the surface of the laser die 340 without being directly bonded or adhered to the first welding pad 341 through the fusion bonding between the cladding layer 405 and the first welding pad 341 forming a weld between the first optical fiber 400 and the first welding pad 341.

FIG. 4 further illustrates the positioning of the first optical fiber 400 with the first optical device package 190. The positioning the first optical fiber 400 with the first optical device package 190 comprising aligning and placing in physical contact a second end of the first optical fiber 400 with a second external interface location on a surface of the first optical device package 190 (e.g., the first bonding layer 113). In an embodiment, once the second end of the first optical fiber 400 is aligned and placed in physical contact with the second external interface location on the surface of the first optical device package 190, the first optical fiber 400 may be adhered to the second external interface location through a second welding process 440. The second welding process 440 may adhere one or more materials of the first optical fiber 400 to the second external interface location by providing localized heat at an interface between the first optical fiber 400 and the second external interface location thereby welding the first optical fiber 400 to the second external interface location. In some embodiments, the second welding process 440 may be a laser welding process wherein a laser is utilized to provide the localized heat at the interface between the first optical fiber 400 and the second external interface location. The second welding process 440 may be performed in a similar manner as discussed with respect to the first welding process 420 above. However, any suitable welding process and welding parameters may be utilized to form the weld between the first optical fiber 400 and the first optical device package 190.

In accordance with some embodiments, the localized heat provided by the second welding process 440 induces the formation of covalent bonds between the surface of the first optical device package 190 and both the core material 403 and the cladding layer 405 of the first optical fiber 400 at the interface between the first optical fiber 400 and the second external interface location. The formation of covalent bonds between the second external interface location and both the core material 403 and the cladding layer 405 of the first optical fiber 400 results in the second external interface location being fusion bonded to the first optical fiber 400.

In another embodiment, an additional welding structure (e.g., the first welding pad 341) is not required to form the weld between the first optical fiber 400 and the first optical device package 190. In this embodiment, the second external interface location may be a structure of the first optical device package 190 itself (e.g., the first dielectric material 115) because the structure utilized at the second external interface location may be formed of a material suitable for forming the fusion bonds between the first optical fiber 400 and the first optical device package 190, such as the structure being formed from silicon dioxide. In another embodiment, an additional welding pad (not separately illustrated) may be formed at the second external interface location on the first optical device package 190 during the formation of the first optical device package 190. In this embodiment the additional welding pad may be formed in a similar manner as the first welding pad 341 formed on the surface of the laser die 340.

In yet another embodiment, the second welding process 440 applies the localized heat to the cladding layer 405 so that covalent bonds are formed between the cladding layer 405 and the second external interface location but the formation of covalent bonds between the core material 403 and the second interface location may be avoided (e.g., no fusion bond is formed between the core material 403 and the first dielectric material 115 of the first bonding layer 113). second welding process 440 In this embodiment the core material 403 may be held in optical alignment with the grating coupler 128 without being directly bonded or adhered to the first optical device package 190 through the fusion bonding between the cladding layer 405 and the second external interface location (e.g., the first dielectric material 115 of the first bonding layer 113) forming a weld between the first optical fiber 400 and the first optical device package 190.

With reference now to FIG. 5, there is illustrated the second optical fiber 500 attached to the first optical device package 190 and disposed on the groove structure 360. In an embodiment the second optical fiber 500 is utilized as an optical input/output port to the first optical device package 190. In an embodiment the second optical fiber 500 is placed so as to optically couple the second optical fiber 500 and an optical input/output port such as the edge coupler 126 located adjacent a third external interface location on the surface of first optical device package 190. By positioning the second optical fiber 500 as such, optical signals leaving the second optical fiber 500 are directed towards the optical components (e.g., the second optical components 125) of the first optical device package 190. Similarly, the second optical fiber 500 is positioned so that optical signals leaving the optical components of the first optical device package 190 are directed into the second optical fiber 500 for transmission. However, any suitable location may be utilized.

In an embodiment, the second optical fiber 500 may comprise a second core material 503 surrounded by a second cladding layer 505. Optionally, a surrounding cover material (not separately illustrated) may be used to surround the second cladding layer 505 in order to provide protection. In an embodiment, the second core material 503 may comprise optical materials such as glass, air, the like, or a combination thereof. Further, the second cladding layer 505 may comprise one or more layers of cladding material, wherein the cladding material may comprise of silicon dioxide ($SiO_2$), silica glass, the like, or combinations thereof. However, any suitable materials may be utilized for the second core material 503 and second cladding layer 505.

In an embodiment, the second optical fiber 500, either with or without the cover material, may have a second diameter D2 in a range of 100 μm to 250 μm, such as about 250 μm. If the second optical fiber 500 does not have the second diameter D2 then a fiber weld robustness would be inadequate. Further, in an embodiment, the second optical fiber 500 includes a tapered portion 507 tapering down towards a tip to be positioned at the third external interface location. In this embodiment, the tapered portion 507 may have a second length L2 in a range from 10 μm to 1,000 μm. If the tapered portion 507 has a length outside the second length L2 then the fiber weld robustness would be inadequate. Further, in this embodiment, the tapered portion 507 may have a third diameter D3 in a range of 10 μm to 127 μm at the tip of the tapered portion 507. In this embodiment, if the tip of the tapered portion 507 does not have the third diameter D3 then the fiber weld robustness would be inadequate.

The second optical fiber 500 may be formed to have the tapered portion 507 through an optical fiber fabrication process involving heating, stretching and cutting the second optical fiber 500 with the tapered portion 507. For example, the second optical fiber 500 may be heated to a third temperature at a stretch point along the second optical fiber 500. In this embodiment, the third temperature is in a range from 400° C. to 1,000° C. If the third temperature is not reached at the stretch point then the second optical fiber 500 may not be pliable enough to stretch the second optical fiber 500 to form the tapered portion 507. Once the stretch point on the second optical fiber 500 has reached the third temperature and while at the third temperature the second optical fiber 500 may be stretched in a direction along a centerline axis of the second optical fiber 500 forming a taper on both sides of the stretch point on the second optical fiber 500 tapering towards the stretch point. Following the heating and pulling of the optical fiber the tapered portion 507 may be formed on either side of the stretch point on the optical fiber. In this embodiment, the optical fiber may then be cut at the stretch point forming the second optical fiber 500 with the tapered portion 507 having the tip with the third diameter D3. In one embodiment, the optical fiber may be cut at the stretch point using a blade and sawing through the optical fiber. However, any suitable process may be used to cut the optical fiber in forming the second optical fiber 500 with the tapered portion 507. Additionally, any suitable method and apparatus may be utilized to heat and pull the optical fiber used in forming the second optical fiber 500 with the tapered portion 507.

Once the second optical fiber 500 has been formed, the second optical fiber 500 may be disposed in the groove structure 360. In an embodiment the second optical fiber is disposed in the groove structure 360 and embedded in the groove such that the tip of the tapered portion 507 aligns with the third external interface location on the surface of the first optical device package 190. In some embodiments, an adhesive (not separately illustrated) may fill the remaining portions of the groove not occupied by the second optical fiber 500 in order to help hold the second optical fiber 500 in alignment with the third external interface location both during a third welding process 520 used to weld the second optical fiber 500 to the third external interface location and after the second optical fiber 500 has been welded to the third external interface location. In another embodiment the adhesive may be utilized to fill the remaining portions of the groove following the welding of the second optical fiber 500 to the third external interface location to help provide long term stability and alignment between the second optical fiber 500 and the first optical device package 190.

Once the tip of the tapered portion 507 of the second optical fiber 500 is aligned with the third external interface location (e.g., the edge coupler 126 of the second optical components 125 located adjacent an edge within the first optical device package 190) the second optical fiber 500 may be welded to the first optical device package 190 at the third external interface location using the third welding process 520. In an embodiment, the third welding process 520 may be performed utilizing the groove structure 360 to facilitate the alignment of the second optical fiber 500 to the third external interface location. In another embodiment, the third welding process 520 may be performed without the second optical fiber being disposed on the groove structure 360 and following the welding of the second optical fiber 500 by the third laser welding process to the first optical device package 190 the second optical fiber 500 may then be disposed on the groove structure 360 for long term support.

In an embodiment, the third welding process 520 may adhere one or more materials of the second optical fiber 500 to the third external interface location by providing localized heat at an interface between the second optical fiber 500 and the third external interface location welding the second optical fiber 500 to the second external interface location. In accordance with some embodiments, the localized heat provided by the third welding process 520 induces the formation of covalent bonds between the surface of the first optical device package 190 (e.g., the dielectric material of the first metallization layer 111) and the tip of the tapered portion 507 of the second optical fiber 500 at the interface between the second optical fiber 500 and the third external interface location. The formation of covalent bonds between the third external interface location and the second optical fiber 500 resulting in a fusion bond between the third external interface location (e.g., the dielectric material of the first metallization layer 111) and the second optical fiber 500. In some embodiments, the third welding process 520 may be a laser welding process wherein a laser is utilized to provide the localized heat at the interface between the second optical fiber 500 and the third external interface location. The third welding process 520 may be performed in a similar manner as discussed with respect to the first welding process 420 above. However, any suitable welding process and welding parameters may be utilized to form the weld between the second optical fiber 500 and the first optical device package 190.

In another embodiment, the third welding process 520 applies the localized heat to the second cladding layer 505 so that covalent bonds are formed between the second cladding layer 505 and the third external interface location but the formation of covalent bonds between the second core material 503 and the third interface location may be avoided (e.g., no fusion bonds are formed between the second core material 503 and the third external interface location). third welding process 520 In this embodiment the second core material 503 may be held in alignment with the edge coupler 126 adjacent the surface of the first optical device package 190 without being directly bonded or adhered to the first optical device package 190 through the fusion bonding between the second cladding layer 505 and the third external interface location (e.g., the dielectric material of the first metallization layer 111) forming a weld between the second optical fiber 500 and the first optical device package 190.

In an embodiment, an additional welding structure (e.g., a similar structure to the first welding pad 341) is not required to form the weld between the second optical fiber 500 and the first optical device package 190. In this embodiment, the third external interface location may be a structure of the first optical device package 190 itself (e.g., the dielectric material of the first metallization layer 111) because the structure utilized at the third external interface location may be formed of a material suitable for forming the fusion bonds between the second optical fiber 500 and the first optical device package 190, such as the structure being formed from silicon dioxide. In another embodiment, an additional welding pad (not separately illustrated) may be formed at the third external interface location on the first optical device package 190 during the formation of the first optical device package 190. In this embodiment the additional welding pad may be formed in a similar manner as the first welding pad 341 formed on the surface of the laser die 340.

Figure 6:
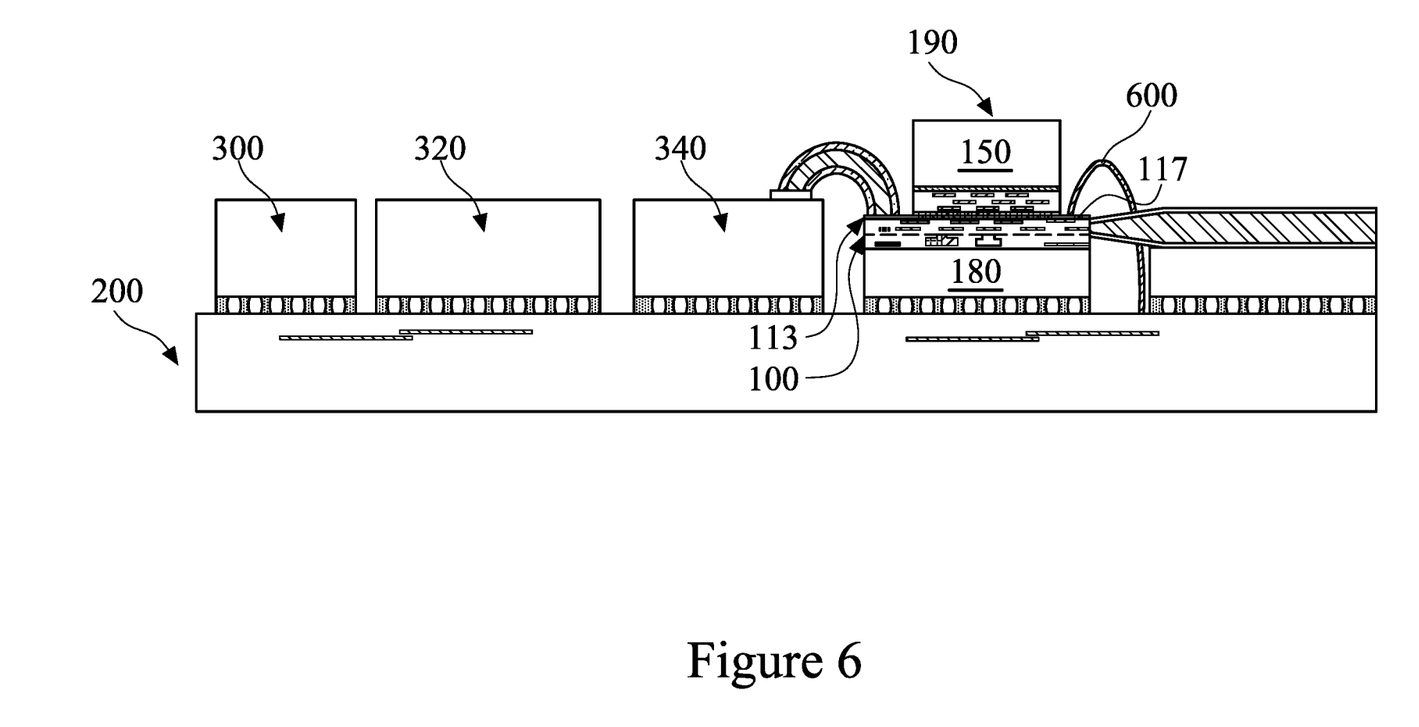
FIG. 6 illustrates that attachment of a conductive wire to the PIC package and to the substrate, in accordance with some embodiments.

With reference now to FIG. 6, there is illustrated a conductive wire 600 coupled between the second substrate 200 and the first optical device package 190. In an embodiment, the conductive wire 600 electrically connects the first optical device package 190 to the second substrate 200 through the first bond pads 117 in the first bonding layer 113 of the first optical device package 190 through a wire bond 601. In an embodiment, the conductive wire 600 may be utilized to supply power to various components of the first optical device package 190 (e.g., the first semiconductor device 150, the first device layer 100, and the second device layer 180) from the second substrate 200. In an embodiment the use of the conductive wire 600 to supply power to the first optical device package 190 avoids the need to utilize an intermediate interposer to transfer power.

In an embodiment the conductive wire 600 may be formed from a material such as gold (Au) or other conductive wire. Further, an electronic flame off (EFO) wand may be used to raise the temperature of the conductive wire 600 within a capillary controlled by a wire clamp (not illustrated). Once the temperature of the conductive wire 600 is raised to a fifth temperature in a range of 150° C. to 250° C., the conductive wire 600 is contacted to the first bond pads 117 to form a first connection and then the conductive wire 600 is moved to the second substrate 200 to form a second connection. Once connected, the remainder of the conductive wire 600 is separated from the connected portions to form the wire bonds 601. The connection process may be repeated to form as many connections as desired between the second substrate 200 and various other components on the second substrate 200 (e.g., the second semiconductor device 300, the third semiconductor device 320, and the laser die 340).

Figure 7:
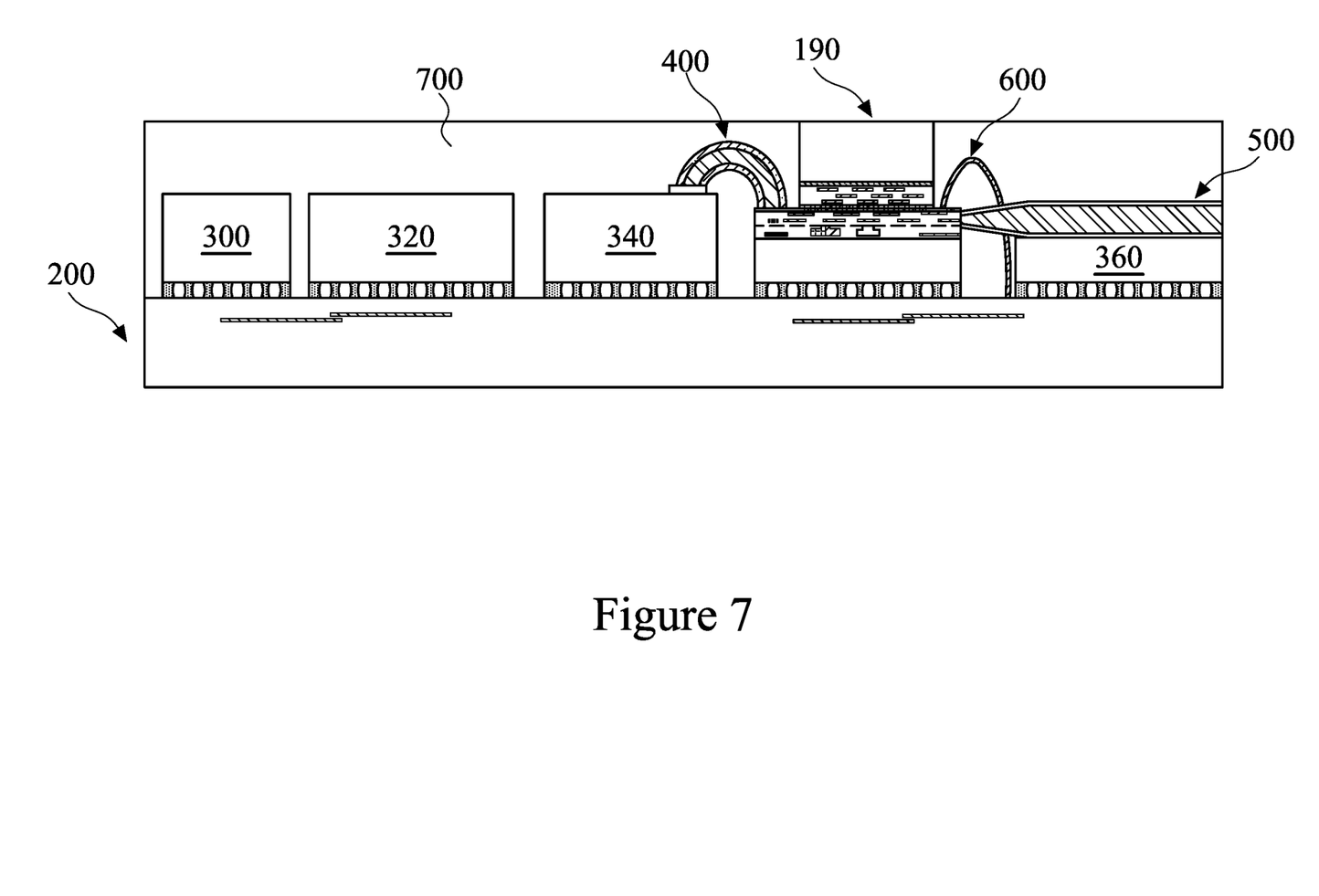
FIG. 7 illustrates the encapsulation of the various semiconductor and optical components on the substrate in a molding compound, in accordance with some embodiments.

With reference now to FIG. 7, an encapsulation 700 is disposed over a surface of the second substrate 200 encapsulating the various components on the second substrate 200 (e.g., the first optical device package 190, the second semiconductor device 300, the third semiconductor device 320, the laser die 340, the groove structure 360, the first optical fiber 400, the second optical fiber 500, the conductive wire 600, etc.) In an embodiment, the encapsulant 700 may be a molding compound, epoxy, or the like. The encapsulant 700 may be applied by compression molding, transfer molding, or the like. The encapsulant 700 is further placed in gap regions between the second semiconductor device 300, the third semiconductor device 320, the laser die 340, the groove structure 360 and the first optical device package 190. The encapsulant 700 may be applied in liquid or semi-liquid form and then subsequently cured.

A planarization process is performed on the encapsulant 700 once the encapsulant 700 has been placed. Once planarized, top surfaces of the encapsulant 700 and the first optical device package 190 are substantially coplanar after the planarization process within process variations. The planarization process may be, for example, a chemical-mechanical polish (CMP), a grinding process, or the like. In some embodiments, the planarization may be omitted.

Benefits may be achieved through the embodiments discussed herein by utilizing a laser welding process (e.g., the first welding process 420) to adhere optical cables (e.g., the first optical fiber 400) to various optical components (e.g., the laser die 340) without the use of an adhesive. By utilizing localized heat through the laser welding process the optical materials of the optical cables may be fused to like optical materials of the various optical components without disrupting the continuity of optical materials with a glue material that may have unlike optical properties. Additionally, the laser welding process may provide improved alignment integrity and attachment longevity and durability as opposed to traditional adhesive methods of attaching the optical fibers.

In accordance with some embodiments of the present disclosure, a method of manufacturing a semiconductor device includes: placing a first optical fiber in physical contact with a first optical device; and welding the first optical fiber to the first optical device. In an embodiment, the welding the first optical fiber to the first optical device includes performing a laser weld. In an embodiment, further including bonding an electrical integrated circuit (EIC) device to a first surface of the first optical device, wherein the EIC device is adjacent to the first optical fiber on the first surface. In an embodiment, further including welding the first optical fiber to a second optical device using a second welding process. In an embodiment, the second optical device includes: a laser die; and a first welding pad deposited over a second surface of the laser die, wherein the first welding pad comprises silicon oxide. In an embodiment, further including welding a second optical fiber to a side surface of the first optical device using a second welding process. In an embodiment, the second optical fiber is supported by a groove structure, wherein the groove structure is formed to a height that aligns the second optical fiber with an edge coupler of the first optical device.

In accordance with some embodiments of the present disclosure, a method includes: bonding a photonic integrated circuit to a circuit board; bonding a laser die to the circuit board adjacent to the photonic integrated circuit; laser welding a first optical cable to the photonic integrated circuit; and laser welding the first optical cable to the laser die. In an embodiment, further including: bonding a v-groove structure to the circuit board adjacent to the photonic integrated circuit; laser welding a second optical cable to the photonic integrated circuit, wherein the second optical cable is supported by the v-groove structure; and laser welding a first conductive wire from a first conductive element of the photonic integrated circuit to a second conductive element of the circuit board. In an embodiment, further including: bonding an XPU device to the circuit board; and bonding a memory device to the circuit board. In an embodiment, the second optical cable is aligned with an edge coupler of the photonic integrated circuit. In an embodiment, the laser welding the first optical cable to the photonic integrated circuit induces a formation of covalent bonds between a material of the first optical cable and the photonic integrated circuit. In an embodiment, the laser welding the first optical cable to the laser die welds the first optical cable to a welding pad of the laser die, wherein the welding pad comprises silicon oxide. In an embodiment, the first optical cable further includes: a core material; and a cladding material surrounding the core material, wherein the laser welding welds the cladding material of the first optical cable to the photonic integrated circuit without welding the core material to the photonic integrated circuit.

In accordance with some embodiments of the present disclosure, a device includes: a photonic integrated circuit; a laser die including a welding pad; and a first optical fiber including: a first end of the first optical fiber fused to a surface of the photonic integrated circuit, wherein a first fusion bond exists between the first end of the first optical fiber and the surface of the photonic integrated circuit; and a second end of the first optical fiber fused to the welding pad, wherein a second fusion bond exists between the second end of the first optical fiber and the welding pad. In an embodiment, further including a second optical fiber supported by a v-groove, wherein the second optical fiber is welded to a surface of the photonic integrated circuit, the second optical fiber being aligned with an edge coupler of the photonic integrated circuit. In an embodiment, the second optical fiber has a tapered tip, the tapered tip aligned with the edge coupler of the photonic integrated circuit. In an embodiment, further including an electrical integrated circuit bonded to the photonic integrated circuit. In an embodiment, further including a conductive wire, the conductive wire bonded to the photonic integrated circuits and to conductive elements in a circuit board. In an embodiment, the first optical fiber includes: a core material; and a cladding material surrounding the core material, wherein the first fusion bond exists between the cladding material at the first end of the first optical fiber and the surface of the photonic integrated circuit, and wherein the second fusion bond exists between the cladding material at the second end of the first optical fiber and the welding pad and the core material is not bonded to either the surface of the photonic integrated circuit or the welding pad.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing a semiconductor device comprising:
    placing a first optical fiber in physical contact with a first integrated circuit device, the first integrated circuit device including a first welding pad;
    welding the first optical fiber to the first welding pad of the first integrated circuit device using a first welding process; and welding the first optical fiber to a second welding pad of a second integrated circuit device using a second welding process.

2. The method of claim 1, wherein the welding the first optical fiber to the first integrated circuit device comprises performing a laser weld.

3. The method of claim 1, further comprising bonding an electrical integrated circuit (EIC) device to a first surface of the first integrated circuit device, wherein the EIC device is adjacent to the first optical fiber on the first surface.

4. The method of claim 1, wherein the first integrated circuit device is a photonic integrated circuit die.

5. The method of claim 1, wherein the second integrated circuit device comprises a laser die, and wherein the second welding pad comprises silicon oxide.

6. The method of claim 1, further comprising welding a second optical fiber to a side surface of the first integrated circuit device using a third welding process.

7. The method of claim 6, wherein the second optical fiber is supported by a groove structure, wherein the groove structure is formed to a height that aligns the second optical fiber with an edge coupler of the first integrated circuit device.

8. A method comprising:
bonding a photonic integrated circuit to a circuit board;
bonding a laser die to the circuit board adjacent to the photonic integrated circuit;
laser welding a first optical cable to the photonic integrated circuit; and
laser welding the first optical cable to the laser die.

9. The method of claim 8, further comprising:
bonding a v-groove structure to the circuit board adjacent to the photonic integrated circuit;
laser welding a second optical cable to the photonic integrated circuit, wherein the second optical cable is supported by the v-groove structure; and
laser welding a first conductive wire from a first conductive element of the photonic integrated circuit to a second conductive element of the circuit board.

10. The method of claim 8, further comprising:
bonding an XPU device to the circuit board; and
bonding a memory device to the circuit board.

11. The method of claim 9, wherein the second optical cable is aligned with an edge coupler of the photonic integrated circuit.

12. The method of claim 8, wherein the laser welding the first optical cable to the photonic integrated circuit induces a formation of covalent bonds between a material of the first optical cable and the photonic integrated circuit.

13. The method of claim 8, wherein the laser welding the first optical cable to the laser die welds the first optical cable to a welding pad of the laser die, wherein the welding pad comprises silicon oxide.

14. The method of claim 8, wherein the first optical cable further comprises:
a core material; and
a cladding material surrounding the core material, wherein the laser welding welds the cladding material of the first optical cable to the photonic integrated circuit without welding the core material to the photonic integrated circuit.

15. A device comprising:
a photonic integrated circuit;
a laser die comprising a welding pad; and
a first optical fiber comprising:
a first end of the first optical fiber fused to a surface of the photonic integrated circuit, wherein a first fusion bond exists between the first end of the first optical fiber and the surface of the photonic integrated circuit; and
a second end of the first optical fiber fused to the welding pad, wherein a second fusion bond exists between the second end of the first optical fiber and the welding pad.

16. The device of claim 15, further comprising: a second optical fiber supported by a v-groove, wherein the second optical fiber is welded to a surface of the photonic integrated circuit, the second optical fiber being aligned with an edge coupler of the photonic integrated circuit.

17. The device of claim 16, wherein the second optical fiber has a tapered tip, the tapered tip aligned with the edge coupler of the photonic integrated circuit.

18. The device of claim 15, further comprising an electrical integrated circuit bonded to the photonic integrated circuit.

19. The device of claim 18, further comprising a conductive wire, the conductive wire bonded to the photonic integrated circuit and to conductive elements in a circuit board.

20. The device of claim 15, wherein the first optical fiber comprises:
a core material; and
a cladding material surrounding the core material, wherein the first fusion bond exists between the cladding material at the first end of the first optical fiber and the surface of the photonic integrated circuit, and wherein the second fusion bond exists between the cladding material at the second end of the first optical fiber and the welding pad and the core material is not bonded to either the surface of the photonic integrated circuit or the welding pad.

\* \* \* \* \*